(12) United States Patent
Kruithof (10) Patent No.: US 8,554,474 B2
(45) Date of Patent: Oct. 8, 2013

(54) REPORTING OF CHANGES IN NAVIGATION MAP DATA FOR NAVIGATION SYSTEM

(75) Inventor: Jacobus Martinus Kruithof, Den Bosch (NL)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 181 days.

(21) Appl. No.: 13/125,397

(22) PCT Filed: Oct. 21, 2008

(86) PCT No.: PCT/NL2008/050661
§ 371 (c)(1),
(2), (4) Date: Apr. 21, 2011

(87) PCT Pub. No.: WO2010/047580
PCT Pub. Date: Apr. 29, 2010

(65) Prior Publication Data
US 2011/0202271 A1      Aug. 18, 2011

(51) Int. Cl.
*G01C 21/26*     (2006.01)

(52) U.S. Cl.
USPC ........... 701/451; 701/411; 701/412; 701/417; 701/532

(58) Field of Classification Search
USPC .................. 701/411, 412, 417, 450, 451, 532
See application file for complete search history.

(56) References Cited

U.S. PATENT DOCUMENTS

| | | | |
|---|---|---|---|
| 6,347,278 B2 * | 2/2002 | Ito | 701/411 |
| 6,353,398 B1 * | 3/2002 | Amin et al. | 340/995.12 |
| 6,418,373 B1 * | 7/2002 | Omi et al. | 701/411 |
| 6,691,128 B2 * | 2/2004 | Natesan et al. | 701/430 |
| 6,721,655 B1 * | 4/2004 | Utsumi | 701/418 |
| 6,909,398 B2 * | 6/2005 | Knockeart et al. | 342/357.31 |
| 7,672,778 B1 * | 3/2010 | Elliott | 701/417 |
| 8,103,448 B2 * | 1/2012 | Nomura | 701/411 |
| 8,180,564 B2 * | 5/2012 | Shikimachi et al. | 701/410 |
| 8,209,123 B2 * | 6/2012 | Miyazaki | 701/532 |
| 2003/0045997 A1 * | 3/2003 | Nakane et al. | 701/202 |
| 2004/0034469 A1 * | 2/2004 | Kim | 701/208 |
| 2004/0117108 A1 * | 6/2004 | Nemeth | 701/200 |
| 2004/0128068 A1 * | 7/2004 | Chun | 701/208 |

(Continued)

FOREIGN PATENT DOCUMENTS

EP     1 530 025 A     5/2005

OTHER PUBLICATIONS http://web.archive.org/web/20070616083643/http://en.wikipedia.org/wiki/Cellular_network.*

*Primary Examiner* — Khoi Tran
*Assistant Examiner* — Adam Mott (57) ABSTRACT

A method, navigation unit and map update server for updating navigation map data are disclosed. Navigation map update data is received from a navigation unit using mobile communications. The navigation map update data is obtained by detecting the position of a vehicle, calculating a route for the vehicle to a destination using the navigation map data and detecting when the calculated route to the destination is left. If so, the method begins storing position data until the vehicle is back on the calculated route, on a recalculated route to the destination from an actual position, or when it has reached the destination. Furthermore, the method comprises evaluating the stored position data to obtain navigation map update data. Navigation map update data is kept local for a geographically limited area corresponding to an area serviced by a network node in the cellular communication network.

14 Claims, 4 Drawing Sheets

(56) References Cited

U.S. PATENT DOCUMENTS

| | | | |
|---|---|---|---|
| 2004/0207541 A1* | 10/2004 | Choi | 340/995.12 |
| 2005/0102097 A1* | 5/2005 | Tanizaki et al. | 701/208 |
| 2005/0102098 A1* | 5/2005 | Montealegre et al. | 701/209 |
| 2006/0116815 A1* | 6/2006 | Nomura | 701/210 |
| 2006/0265125 A1* | 11/2006 | Glaza | 701/210 |
| 2007/0083326 A1* | 4/2007 | Johnson et al. | 701/209 |
| 2007/0213927 A1* | 9/2007 | Ishigami et al. | 701/207 |
| 2008/0177470 A1* | 7/2008 | Sutardja | 701/210 |
| 2008/0208444 A1* | 8/2008 | Ruckart | 701/200 |
| 2011/0307170 A1* | 12/2011 | Yamamoto et al. | 701/201 |

* cited by examiner

REPORTING OF CHANGES IN NAVIGATION MAP DATA FOR NAVIGATION SYSTEM

TECHNICAL FIELD

The present invention relates to a method for updating navigation map data, to a navigation unit and to a navigation map server.

BACKGROUND

German patent publication DE-A-100 30 932 discloses a method and system for updating navigation map data. A vehicle continuously detects its position, e.g. using a Global Positioning System (GPS) receiver, and stores the detected position data. In a continuous or periodic manner or on request basis, the collected position data is transferred to a central database. The collected update data of multiple vehicles is evaluated by a navigation map manufacturer, and updates are made to navigation map data. The updated navigation map data may again be disseminated to navigation map data providers or to users of the navigation maps. This process usually involves a long time interval between navigation map updates.

SUMMARY

The present invention seeks to provide an improved navigation map data update method and system, in which the navigation map data, used by a navigation unit, can be updated more frequently and more reliable than in existing methods.

According to the present invention, a method for updating navigation map data is provided, comprising receiving navigation map update data from a navigation unit using mobile communications. The navigation map update data is obtained by detecting the position of a vehicle, calculating a route for the vehicle to a destination using the navigation map data and detecting when the calculated route to the destination is left, and if so, start storing position data until the vehicle is back on the calculated route, on a recalculated route to the destination from an actual position, or when reaching the destination. Furthermore, the method comprises evaluating the stored position data to obtain navigation map update data. As only data relating to deviations in existing navigation map data is collected and transmitted, much less data is required to be transmitted compared to prior art solutions where all detected position data is transmitted.

Detecting when the calculated route to the destination is left may be accomplished by detecting a deviation of the route by comparing detected actual location with the (re)calculated route. This navigation map update data, originating from actual presence at the associated locations, is much more up to date and reliable than other methods used, and may be used by navigation map data manufacturers, but also by navigation map users.

In a further aspect, the present invention relates to a navigation unit arranged to communicate with a cellular communication network, the navigation unit comprising a processor connected to a navigation device and to a memory unit, the navigation device being arranged to detect an actual location of the navigation unit, and the memory unit being arranged to store navigation map data. The processor is arranged to calculate a route to a destination using the navigation map data, to detect when the calculated route to the destination is left, and if so, initialize a transmission of the detected position data to a navigation map server via the mobile communication unit.

In an even further aspect, the present invention relates to a method for updating navigation map data, comprising calculating a route for a vehicle to a destination using navigation map data, detecting an actual position, detecting when the calculated route to the destination is left, and if so, transmitting the detected position data to a navigation map server.

Again, only data relating to deviations to navigation map data needs to be transmitted to the navigation map server, resulting in a lot less data traffic between the navigation unit and the navigation map server.

Furthermore, in a further aspect, the present invention relates to a navigation map server in communication with a network node associated with a group of cells of a cellular communication network, the map update server comprising a memory unit for storing navigation map data, a map update service module being arranged to receive stored position data from a navigation unit via the cellular communication network, the stored position data comprising deviations from a calculated route, and an evaluation module in communication with the map update service module, the evaluation module being arranged to evaluate the stored position data to obtain navigation map update data for a geographically limited area associated with the group of cells.

Also, the present invention relates to a method for updating navigation map data, comprising receiving via a network node associated with a group of cells of a cellular communication network stored position data from a navigation unit, the stored position data comprising deviations from a calculated route, and evaluating the stored position data to obtain navigation map update data for a geographically limited area associated with the group of cells.

By keeping the navigation map update process limited to a part of the cellular communication network servicing the geographically limited area associated with a group of cells, the data traffic load on the entire cellular communication network can be limited.

BRIEF DESCRIPTION OF DRAWINGS

The present invention will be discussed in more detail below, using a number of exemplary embodiments, with reference to the attached drawings, in which.

DETAILED DESCRIPTION

Figure 1:
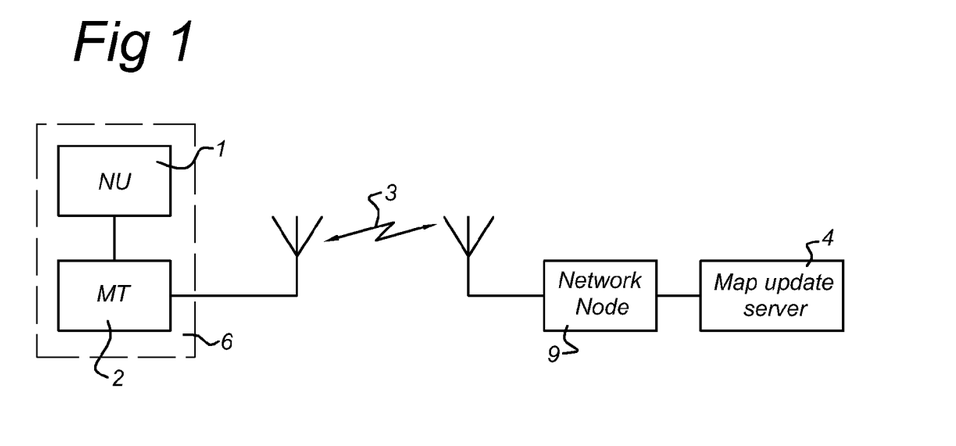
FIG. 1 shows a schematic block diagram of an embodiment of the present invention.

In FIG. 1, a schematic block diagram is shown showing generic functional elements as used in embodiments of the present invention. The present invention embodiments implement automatic reporting of changes and/or errors in navigation maps as used by navigation systems, such as vehicle navigation systems using Global Positioning System (GPS) location. A navigation unit 1 is carried in a vehicle 6 and provides navigation and route information to a driver of the vehicle 6. For this, the navigation unit 1 in an embodiment (see FIG. 3) comprises a processor 11 under software control, memory 12 and an input/output unit 13 interfacing the processor 11 with peripherals such as a (touch screen) display 14, keyboard 15. Furthermore, the processor 11 is connected to a navigation device 16, e.g. in the form of a position location device such as a GPS receiver (see also the more detailed block diagram shown in FIG. 3). Furthermore, the processor 11 is in communication with a map update service module 17, which may be arranged to execute one or more of the embodiments of the present invention. In the embodiments shown in FIG. 1 and FIG. 3, the navigation unit 1 is connected to a mobile terminal 2, which uses a wireless connection 3, e.g. a connection in a cellular mobile telecommunication network 25, to send data to and receive data from a map update server 4, via a network node 9, such as a Serving General packet radio Support Node (SGSN) in a Global System for Mobile (GSM) or a Universal Mobile Telecommunication System (UMTS) network. Alternatively the functionality of the mobile terminal 2 can be incorporated within the navigation unit 1 itself. The map update server 4 may be part of a navigation map server 4 which includes the functionality of the map update server 4 as described in the embodiments below.

Navigation systems in general indicate on a display route instructions to a (final) destination using GPS receivers and navigation maps, preloaded as navigation map data. Generally the route suggested by the navigation unit 1 is calculated using the actual position using GPS data, the destination as provided by the driver of vehicle 6, and the navigation map data.

Sometimes additional data from a Traffic Message Channel (TMC) Frequency Modulated (FM)-broadcasts are used to adapt route information based on actual events, e.g. traffic jam or road work information.

Errors and updates to the navigation maps are delivered to the navigation unit 1 using map updates, either in hardware or software. These errors and updates are reported in various ways to cartographers who will update the navigation maps indirectly. It takes quite some time before navigation map updates are processed and delivered to the navigation units 1 of end users, e.g. once a year or once every three months. Furthermore it is not possible to have automatic reporting of updates and errors in the maps used in navigation systems.

Figure 2:
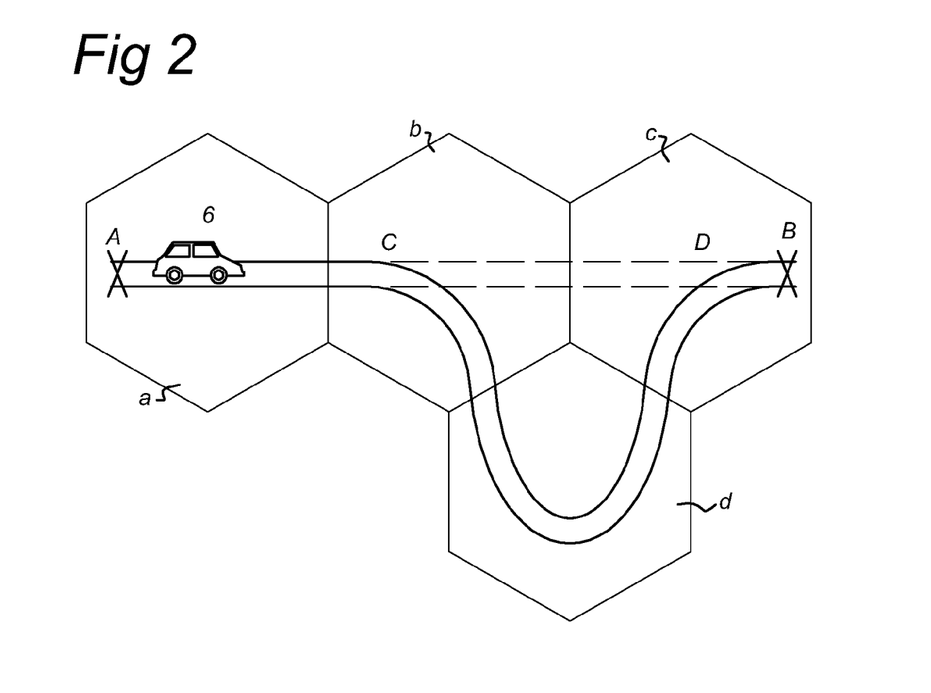
FIG. 2 shows a schematic view of a situation in which the present invention may be applied.

In FIG. 2 an example of a situation encountered using the present invention embodiments is shown schematically. A route is calculated by the navigation unit 1 from point A to a destination (point B). Using the navigation map data, the route calculated is not a straight line, but includes a turn at point C and point D. In the actual situation, a road has been provided between points C and D, and the vehicle 6 can take a straight line route from point A to point B. Also in FIG. 2, a cellular network is drawn including four cells, indicated by small capitals a-d. A mobile terminal 2 in the vehicle 6 would subsequently be connected to cell a, b, d, c when travelling the indicated route. Each cell a-d represents a geographical area serviced by a radio access implementation of a cellular network 25 such as GSM or UMTS.

A group of cells a-d may also be seen as the geographical area serviced by a network node 9 of the cellular communication network 25, e.g. a SGSN 9 servicing one or more Radio Network Controller (RNC) 8 with in turn one or more related Node-B units 7 in a UMTS network. The SGSN 9 can also service one or more Base Station Controllers (BSC) 8 with in turn one or more Base Transceiver Stations (BTS) 7 in a GSM network, for data transmissions. This is shown in more detail in the schematic view as depicted in FIG. 3.

According to an embodiment of the present invention, the navigation unit 1 comprises a navigation map update service module 17, e.g. in the form of a hardware subunit or software module installed in the navigation unit 1 (see FIG. 3), or alternatively as a separate hardware unit connected to the navigation unit 1. The map update service module 17 interfaces with the normal functions of the navigation unit 1. As shown in the flow diagram of FIG. 4, a position is detected (step 31) and a route to a destination B is (re-)calculated (step 32). When the navigation unit 1 detects that the vehicle 6 has left the calculated route and takes another route than suggested (e.g. the dashed route from point C to D in FIG. 2 instead of the suggested route indicated as a solid line in FIG. 2), it notifies the map update service module 17, which in turn starts to record the route taken (e.g. at local storage device 12 in navigation unit 1), based on the actual location. The route taken, regarded as a route deviation, can be stored as navigation map update data comprising subsequent positions of the vehicle 6 as determined by the navigation unit 1, e.g. every second. This step can also be seen as determining whether or not a deviation from the route is present, see step 33 in the flow diagram of FIG. 4. The stored navigation map update data is transmitted by the map update service module 17 of the navigation unit 1 to the map update server 4 in the cellular communication network 25 with regular intervals (e.g. intervals in time, or intervals in the amount of data to be sent). Alternatively, the stored navigation map update data is transmitted upon request of the map update server 4, or transmitted as a continuous stream of position data as long as the navigation unit 1 detects a position which is a deviation from the original route (see also step 37 in the flow diagram of FIG. 4).

Figure 3:
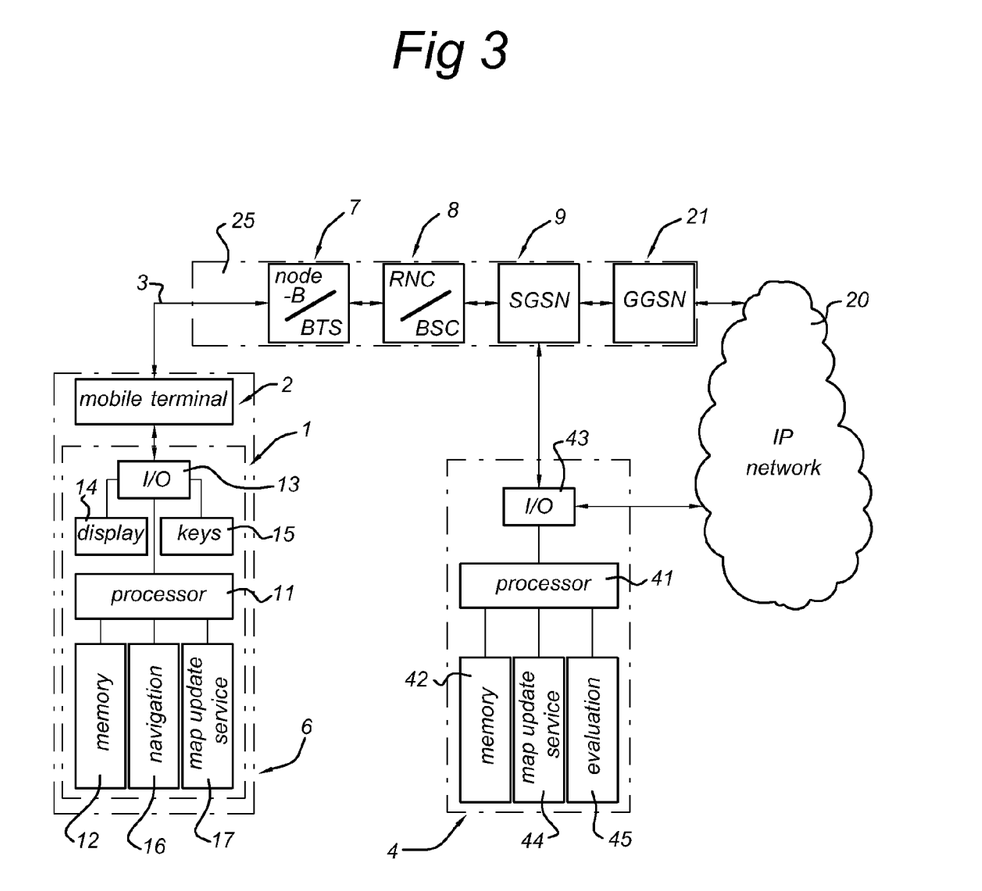
FIG. 3 shows a more detailed schematic block diagram of a further embodiment of the present invention.
Figure 4:
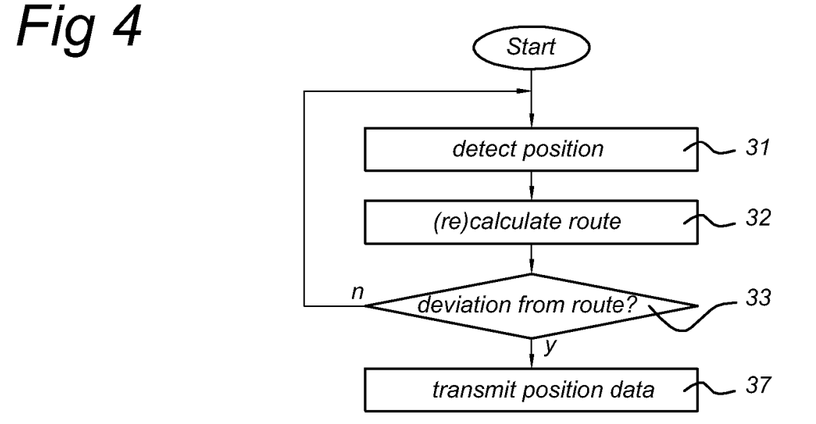
FIG. 4 shows a flow diagram of an embodiment of the present invention.

In FIG. 3, a more detailed schematic view is shown of a possible implementation structure of the present invention. The map update server or navigation map server 4 in this embodiment comprises a processor 41 connected to a memory unit 42 and an input/output unit 43. Furthermore, special software modules may be provided in communication with the processor 41 (either software of hardware modules) which implement a map update service module 44 (as an alternative to or shared with the map update service 17 in the navigation unit 1) and an evaluation module 45.

Figure 5:
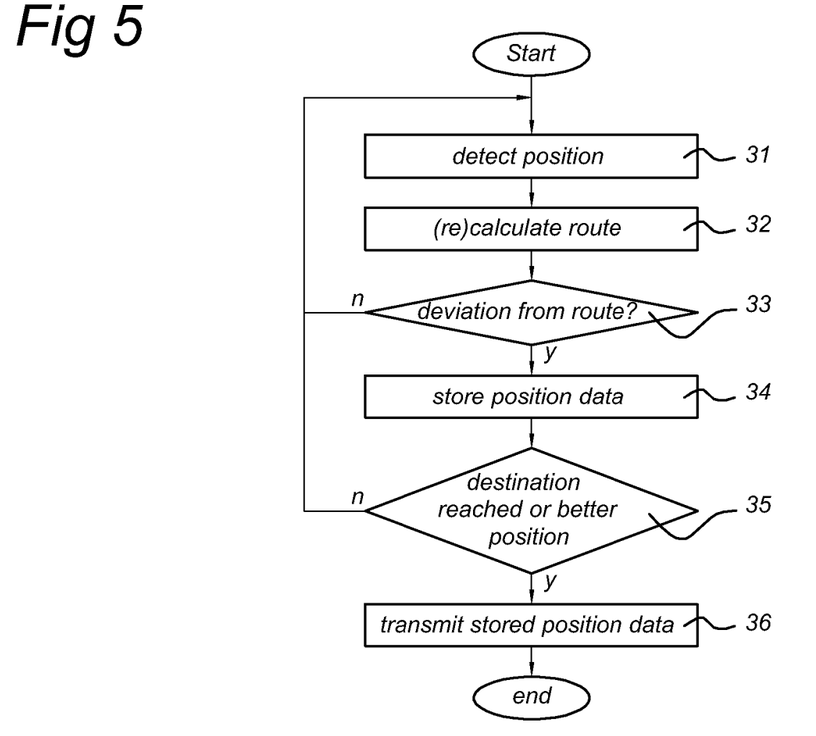
FIG. 5 shows a flow diagram of a further embodiment of the present invention.

The map update service module 17 associated with the navigation unit 1 performs the following functionalities in one embodiment of the present invention, of which the respective steps are shown in the flow diagram of FIG. 5:
  detecting the actual position of the vehicle (step 31);
  (re-)calculating a route for a vehicle to a destination using navigation map data (step 32);
  detecting when the calculated route to the destination is left (step 33), and if so, transmitting the position data to a navigation map server (step 36).

In a further embodiment, furthermore position data is stored locally (step 34) until the vehicle is back on the calculated route, on a recalculated route to the destination from the actual position (i.e. in a better position), or when reaching the destination (step 35). Upon detection of that situation, the detected position data (which is stored locally) is transmitted to the navigation map server 4. One or more of these functions may be executed by one of the other functional entities in the navigation unit, e.g. processor 11 or navigation device 16.

Figure 6:
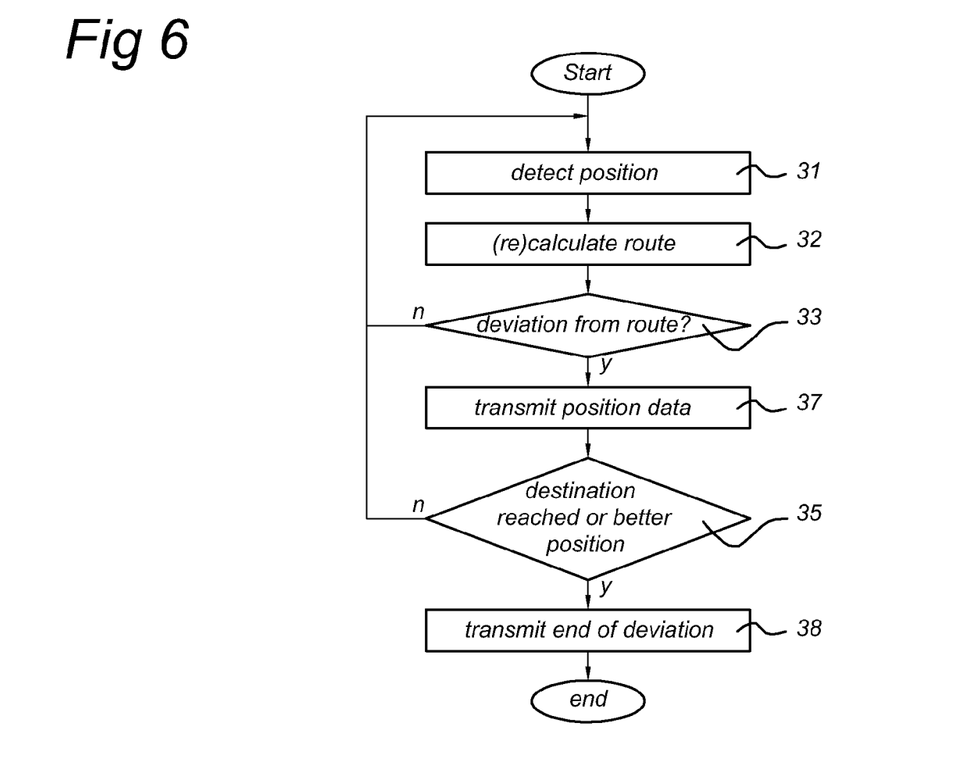
FIG. 6 shows a flow diagram of an even further embodiment of the present invention.

In a further embodiment, the map update service module 17 is arranged to directly transmit the detected deviations to the map update server 4 in the telecommunications network, i.e. to stream the position data as long as a deviation is present. This is depicted in the flow diagram of FIG. 6, which closely resembles the flow diagram of FIG. 5. In this embodiment, when a deviation from the route is detected (step 33), the detected position data is transmitted to the map update server 4 (step 37). Furthermore, the navigation map server 4 is notified (e.g. by transmitting a message) that the vehicle is back on the calculated route, a recalculated route to the destination from the actual position, or that the destination has been reached (step 38).

The navigation map update data is, in a further embodiment, determined by comparing the stored position data with the navigation map data stored in the memory unit 12, and transmitting the navigation map update data to the navigation map server 4.

Figure 7:
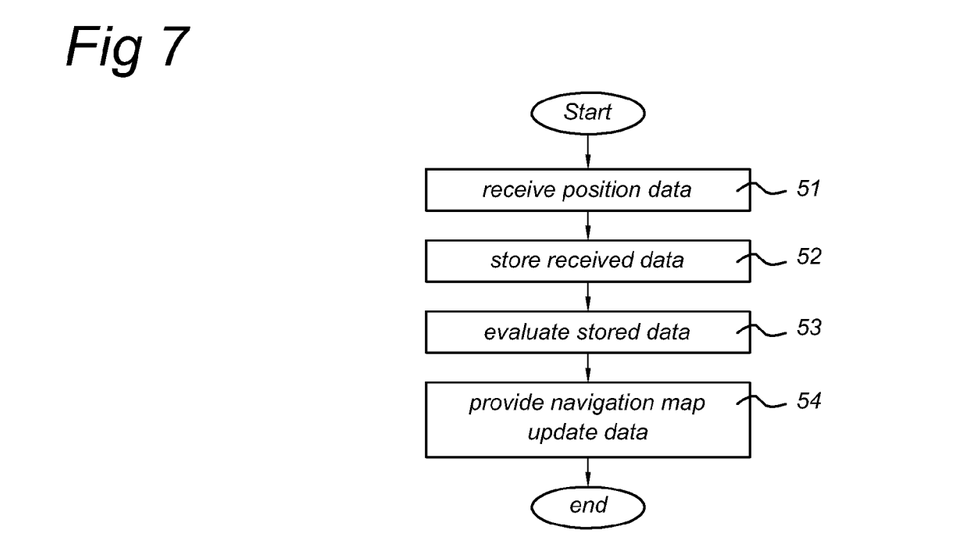
FIG. 7 shows a flow diagram of an embodiment of the present invention relating to the navigation map server functionality.

From the viewpoint of the map update server 4, position data is received (see step 51 in the flow diagram as depicted in FIG. 7), either as a continuous stream, or as a list or file of detected position data. The data may be received from a navigation unit 1 via a network node 7, 8, 9 associated with a group of cells a-d of a cellular communication network 25. The map update server 4 is furthermore arranged to store the received data (step 52) and to evaluate the stored data (step 53) to obtain navigation map update data for geographically limited area associated with the group of cells a-d. Finally, the navigation map update data is provided (step 54) either as update data for new maps, or as updates to individual navigation units 1.

The map update server 4 in an embodiment comprises a navigation map update data evaluation module 45, which evaluates the detected routes (i.e. sequences of detected and transmitted positions) with respect to navigation map data stored in memory unit 42 and determines and stores the navigation map update data in the memory unit 42.

When the final destination B is reached or when the navigation unit 1 is back at a better point than before the route was left on a possibly (re-)calculated route to the destination (e.g. point D in FIG. 2), recording of the map update data is halted by the map update service module 17 in the navigation unit 1. A better point in this context is to be interpreted as shorter in time or distance to the destination B. The recorded information is then sent via mobile communication networks such as GPRS, UMTS or equivalent technologies, e.g. using the mobile terminal 2, to the map update server 4.

The map update server 4 is associated with a geographically limited service area belonging to at least a part of a group of cells a-d in which the vehicle 6 is presently located. The geographically limited service area is less than a complete coverage area of an entire cellular network 25. The map update server 4 may be in communication with (or even part of) one of the network nodes 7, 8, 9 as depicted schematically in FIG. 3, as the hierarchic structure of the cellular communication network 25 then assures that the map update function is limited to a geographically limited area covering a group of cells a-d in a cellular communication network 25. This also has the effect that data traffic in the network 25 associated with the map update server 4 is limited to only the network part below the SGSN 9 (i.e. the left part of cellular network 25 as seen in the hierarchical view of FIG. 3), and hierarchical part of the network above the SGSN 9 is not loaded with any additional data traffic.

The map update server 4 may be comprised in a Serving General packet radio Support Node (SGSN) 8 of a mobile telecommunication network 25, such as a Global System for Mobile communication (GSM) or Universal Mobile Telecommunication System (UMTS) network. The map update server 4 may alternatively be comprised in an IP Multimedia Subsystem (IMS) application server communicatively connected to a mobile telecommunication network 25. Furthermore, the map update server may be comprised in UMTS mobile telecommunication network nodes such as a Radio Network Controller (RNC) 8 or a Node-B 7. Also, the map update server may be comprised in a Base Station Controller 8 or a Base Transceiver Station 7 of a GSM mobile telecommunication network.

In an exemplary embodiment, the map update server 4 is a separate server connected to a network node 9, e.g. the SGSN, of the cellular communication network. In this manner, the map update data about the route deviation used by the vehicle 6 is uploaded to the map update server 4 for that service area only. In further embodiments, the map update server 4 may be associated with lower hierarchical network nodes, such as the RNC/BSC 8 or Node-B/BTS 7.

Instead of being connected to the SGSN 9, map update server 4, e.g. implemented as an IP Multimedia Subsystem (IMS) application server can be reached via a Gateway GPRS Support Node (GGSN) 21, wherein the GGSN 21 connects the SGSN 9 of the mobile network to a packet data network such as an IP network 20 comprising the map update server 4. The SGSN 9 and GGSN 21 are regarded as nodes applicable to both GSM and UMTS networks This way the map update process can be kept limited to the location where the route deviation is applicable to as the SGSN 9 controls only a limited number of RNC/BSC units 8 and Node-B/BTS nodes 7 corresponding to a limited number of cells in the cellular network.

The reported route deviations with the corresponding navigation map update data relating to the geographical area of the associated cells a-d of the calculated route are collected and evaluated by the map update server 4. When the same or similar route deviations are reported on the same part of the calculated route by different navigation units 1 in vehicles 6 to the map update server 4 co-located with the SGSN 9, this map update server 4 is arranged to (automatically) report the route deviations to the cartographers or navigation map providers, so that new maps may be issued including the evaluated route deviations as reported.

In an embodiment, a prolonged period of collection of reported route deviations may be taken into account, to be sure that the route deviation is a true and lasting change. Map update server 4 could apply a predetermined threshold of reported route deviations as a trigger to initiate a message with navigation map update data to the navigation map provider or cartographer (e.g. via IP network 20). I.e., the map update server 4 is arranged to evaluate the stored position data received from a plurality of navigation units 1, and to determine the navigation map update data based on a threshold value of occurrences of stored position data. Furthermore, disseminating the navigation map update data to navigation units 1 operating in the geographically limited area is comprised in a further embodiment.

In a further embodiment, the map update server 4 is arranged to store the reported route deviations as temporary local map update for the geographical area of the group of cells a-d covered by that map update server 4. Using similar data transmission as in reported route deviations by navigation units 1 in vehicles 6 (i.e. using wireless connection 3 for GPRS/UMTS data exchange), the map update server 4 may also be arranged to disseminate the stored data to mobile terminals 2 (connected to navigation units 1 of vehicles 6) entering the cell a-d where the route deviation is applicable. Map update data can be sent periodically to all navigation units 1 in the service area of the SGSN 9 or other network node 7, 8 associated with the map update server 4, and all necessary map update data can be sent to the navigation units 1 when these units 1 are either turned on or entering the service area of the network node 9.

Note that for the wireless connection 3 a normal packet switched connection controlled by a SGSN 9 is used, but possibly also a dedicated packet switched connection could be used to the BSC/RNC 8 in the communication network.

In one embodiment, the feature to keep the data exchange for map update information local at the network control node 9 (e.g. at the SGSN 9) of a specific group of cells a-d and the associated map update server 4 is implemented by using a specific Packet Data Protocol (PDP) context that can be configured in such way that the PDP context terminates at either the SGSN 9 itself or the associated map update server 4 connected to the network control node 9. Alternatively the PDP context terminates at the GGSN 21, connected to the map update server 4 via a packet data network (such as IP network 20).

The navigation unit 1 communicates via a radio access unit 7, e.g. a BTS in a GSM network or a Node-B unit in a UMTS network, and a RNC/BSC unit 8 with the SGSN 9 associated with the present group of cells a-d. The map update server 4 is in communication with the SGSN 9 using a special PDP for local services. The data exchange ends here, and is not transmitted further into the communication network as in known applications using a connection to an IP network 20 using a GPRS Node. Note that, as opposed to normal IP connections to mobile data services, in this case it is not a problem if the data connection is lost and, for instance, the IP address of the navigation unit 1 (or associated mobile terminal 2) changes when roaming to another SGSN 9 associated with a neighboring group of cells, as other route deviation information will be retrieved from the other SGSN 9.

Navigation unit 1 (or associated mobile terminal 2) may even support multiple PDP contexts at the same time so that in case also a further data connection for another application related to the navigation unit 1 is needed (e.g. a weather update), this connection may not suffer from the connection loss on the dedicated connection to the map update server 4. Note that this PDP context may also be used for other geographically bound information.

In addition to the functions discussed above, the map update server 4 (or already the navigation unit 1) may be arranged to filter out detours for fuel stations, restaurant visits etc. easily as these visits, when occurring more frequently will also typically include a longer time where the navigation unit 1 is stationary, and can be excluded based on that data. This function may be implemented in the map update service module 17 of navigation unit 1, or alternatively in the update evaluation module 45 in map update server 4.

In a further embodiment, the map update server 4 (or specifically the map update service module 44) is arranged to disseminate the navigation map update data to navigation units (1) operating in the geographically limited area. When a navigation unit 1 enters the geographically limited area covered by a group of cells a-d, corresponding to a location or routing area of the communication network 25, stored route deviations relevant for that geographical area are sent from the map update server 4 to the navigation unit 1. Map update data relevant for that group of cells may include data on roads in the vicinity of the cells a-d which are also related to the importance of the road. E.g. the map update data relating to the new road from point C to D in cells b and c as shown in FIG. 2 may also be reported when a vehicle 6 enters cell a, as the section C-D is also important for the major road from point A to B.

In a further embodiment, a map update server 4 associated with a network node 9 covering a geographically limited service area may exchange updated navigation map information with a further map update server 4 associated with another geographically limited service area, e.g. a neighboring or adjacent geographically limited service area. This allows to share important navigation map update data which is relevant for other (neighboring) geographically limited areas, e.g. relating to route deviations on major roads or roads in the vicinity.

The navigation map update data may result from calamities, navigation map faults and errors as reported using the above described embodiments. However, also further changes inserted by other means in the map update server 4 may be included (e.g. unplanned or planned road work). Based on this information the route can be re-calculated in the navigation unit 1. The received information may be cached in the navigation unit 1 for future use.

Using the above described invention, updates to navigation maps using real-time information are available faster and enables a more convenient route planning. There is no need to do a complete update of the navigation map in the navigation unit 1, only those parts the user may become interested in in the near future need to be updated. Furthermore navigation map providers or cartographers can receive information on map updates faster. The invention as presented provides a more efficient maintenance of navigation map as only exceptions to a correspondence between the actual roads and navigation maps have to be analyzed, opposed to a situation where all roads have to be frequently checked whether they still correspond to the representation on a navigation map.

New developed areas with roads that are not yet represented on navigation maps could be recorded by deployment of the embodiments above and provided to a cartographer for making new navigation maps.

Although FIG. 3 presents map update server 4 communicatively connected to the SGSN node 9, this map update server 4 may be connected to or comprised by any other node as the RNC/BSC 7 or Node-B/BTS 8 of the communication network where the configuration depends on a trade off between number of map update servers 4 and the amount of network signalling traffic related to the map updates. The mutual exchange communication between the map update servers 4 for navigation units 1 crossing service areas is also a configuration parameter.

Although FIG. 2 presents four cells a-d, the invention is applicable to any number of cells, even in a single cell, as the location of the map update server 4 is flexible with respect to the network node 9 in the mobile network, e.g. from GGSN 21 to Node-B/BTS 7, serving multiple- until a single cell respectively.

Mobile operators gain revenue by adding a value added service and/or getting extra usage of their data network. Data is local to the place where it is needed (not crossing the entire communication network to a GGSN 21 and to an IP network 20) thus saving on backbone capacity of the communication network.

The invention embodiments have been described above using a number of examples. Alternatives to and modifications of certain elements and features as described above relating to various embodiments are possible and included in the scope of protection which is defined in the claims as appended.

The invention claimed is:
1. A method for updating navigation map data, comprising using mobile communications to receive navigation map update data from a plurality of navigation units each carried by a corresponding one of a plurality of vehicles, the navigation map update data being obtained by;
  detecting a position of each vehicle via operation of a respective navigation unit;
  calculating a route for each vehicle to a destination via operation of the respective navigation unit using the navigation map data;
  detecting when the calculated route to the destination is left by each vehicle via operation of the respective navigation unit, and then storing position data of the vehicle in a memory of the vehicle's navigation unit until:
    the vehicle is back on the calculated route,
    the vehicle is on a recalculated route to the destination from an actual position, or
    the vehicle has reached the destination, and
  evaluating the position data stored by the respective navigation units of the plurality of vehicles to obtain the navigation map update data after a number of the plurality of vehicles that left the calculated route exceeds a threshold value;
  wherein storing the position data and evaluating the position data includes filtering out position data corresponding to detours for fuel stations, restaurants visits, and other events associated with prolonged periods of the navigation unit being stationary.

2. A method according to claim 1, in which evaluating the position data to obtain the navigation map update data based on the threshold value of occurrences of position data is performed by a first navigation map server of a first geographically limited service area, and in which the method further comprises exchanging the navigation map update data with a second navigation map server of a second geographically limited service area.

3. A navigation unit arranged to communicate with a cellular communication network, the navigation unit comprising:
  a processor connected to a navigation device, a mobile communication unit and toa memory unit,
  the navigation device being arranged to detect an actual location of the navigation unit,
  the memory unit being arranged to store navigation map data, and
  the processor being arranged to:
    calculate a route to a destination using the navigation map data;
    detect when the calculated route to the destination is left, and if so, store detected position data in the memory unit;
    filter out detected position data corresponding to detours for fuel stations, restaurant visits, and other events associated with prolonged periods of the navigation unit being stationary; and
    initialize a transmission of the detected and filtered position data to a navigation map server via the mobile communication unit upon detection that:
      a detected actual location is back on the calculated route,
      the detected actual location is on a recalculated route to the destination from the actual location, or
      the destination has been reached.

4. The navigation unit according to claim 3, in which the processor is further arranged to:
  determine navigation map update data by comparing the stored and filtered position data with the navigation map data stored in the memory unit, and
  transmit the navigation map update data to the navigation map server.

5. The navigation unit according to claim 3, in which the processor is further arranged to receive navigation map update data when entering a geographically limited area associated with the navigation map server.

6. A method performed by a navigation unit of a vehicle for updating navigation map data, comprising:
  detecting an actual position;
  calculating a route for a vehicle to a destination using navigation map data;
  detecting when the calculated route to the destination is left, and if so, continuously storing detected actual position data until:
    the vehicle is back on the calculated route,
    the vehicle is on a recalculated route to the destination from the actual position, or
    the destination has been reached; wherein storing detected actual position data comprises filtering out detected position data corresponding to detours for fuel stations, restaurant visits, and other events associated with prolonged periods of the navigation unit being stationary; and then
  transmitting the detected actual position data to a navigation map server.

7. The method according to claim 6, further comprising transmitting to the navigation map server an indication that:
  the vehicle is back on the calculated route,
  the vehicle is on the recalculated route to the destination from the actual position, or
  the destination has been reached.

8. A navigation map server in communication with a network node associated with a group of cells of a cellular communication network, the navigation map server comprising:
  a memory unit for storing navigation map data,
  a map update service module being arranged to receive position data from a plurality of navigation units via the cellular communication network, the position data comprising deviations from a calculated route, wherein data corresponding to detours for fuel stations, restaurant visits, and other events associated with prolonged periods of the navigation unit being stationary are filtered out; and
  an evaluation module in communication with the map update service module, the evaluation module being arranged to evaluate the position data to obtain navigation map update data for a geographically limited area associated with the group of cells based on a threshold value of occurrences of the position data.

9. The navigation map server according to claim 8, in which the map update service module is arranged to disseminate the navigation map update data to the plurality of navigation units operating in the geographically limited area.

10. The navigation map server according to claim 8, wherein the network node is a Serving GPRS Support Node (SGSN) of a mobile telecommunication network.

11. The navigation map server according to claim 8, wherein the network node is an Internet Protocol Multimedia Subsystem (IMS) application server in a mobile telecommunication network.

12. A navigation map server according to claim 8, in which the network node associated with the group of cells of the cellular communication network is a first network node associated with a first group of cells of the cellular communication network, and in which the map update service module is arranged to exchange the navigation map update data with a navigation map server of a second network node associated with a second group of cells of the cellular communication network.

13. A method for updating navigation map data, comprising:
   receiving via a network node associated with a group of cells of a cellular communication network position data from a plurality of navigation units,
   storing the position data comprising deviations from a calculated route, filtering out detected position data corresponding to detours for fuel stations, restaurant visits, and other events associated with prolonged periods of the navigation unit being stationary; and
   evaluating the position data to obtain navigation map update data for a geographically limited area associated with the group of cells, wherein evaluating the position data to obtain navigation map update data is based on a threshold value of deviations from the calculated route.

14. The method according to claim 13, in which the network node associated with the group of cells of the cellular communication network is a first network node associated with a first group of cells of the cellular communication network, and in which the method further comprises exchanging the navigation map update data with a second network node associated with a second group of cells of the cellular communication network.

* * * * *

UNITED STATES PATENT AND TRADEMARK OFFICE
CERTIFICATE OF CORRECTION

PATENT NO. : 8,554,474 B2
APPLICATION NO. : 13/125397
DATED : October 8, 2013
INVENTOR(S) : Kruithof Page 1 of 1

It is certified that error appears in the above-identified patent and that said Letters Patent is hereby corrected as shown below:

In the Specification

In Column 5, Line 63, delete "(SGSN) 8" and insert -- (SGSN) 9 --, therefor.

In Column 8, Line 23, delete "interested in in" and insert -- interested in --, therefor.

In Column 8, Line 39, delete "RNC/BSC 7 or Node-B/BTS 8" and insert -- RNC/BSC 8 or Node-B/BTS 7 --, therefor.

In the Claims

In Column 9, Line 2, in Claim 1, delete "by;" and insert -- by: --, therefor.

In Column 9, Line 38, in Claim 3, delete "toa" and insert -- to a --, therefor.

Signed and Sealed this
Eleventh Day of November, 2014

Michelle K. Lee
*Deputy Director of the United States Patent and Trademark Office*